United States Patent
Wu et al.

(10) Patent No.: US 12,448,506 B2
(45) Date of Patent: Oct. 21, 2025

(54) POLYMER COMPOSITIONS FOR EXTRUDED PROFILES

(71) Applicant: Dow Global Technologies LLC, Midland, MI (US)

(72) Inventors: Xiaosong Wu, Sugar Land, TX (US); Varun Thakur, Cham (CH)

(73) Assignee: Dow Global Technologies LLC, Midland, MI (US)

(*) Notice: Subject to any disclaimer, the term of this patent is extended or adjusted under 35 U.S.C. 154(b) by 882 days.

(21) Appl. No.: 17/639,577

(22) PCT Filed: Sep. 21, 2020

(86) PCT No.: PCT/US2020/051874
§ 371 (c)(1),
(2) Date: Mar. 1, 2022

(87) PCT Pub. No.: WO2021/061580
PCT Pub. Date: Apr. 1, 2021

(65) Prior Publication Data
US 2022/0289960 A1 Sep. 15, 2022

Related U.S. Application Data

(60) Provisional application No. 62/905,016, filed on Sep. 24, 2019.

(51) Int. Cl.
*C08L 23/16* (2006.01)
(52) U.S. Cl.
CPC ......... *C08L 23/16* (2013.01); *C08L 2205/025* (2013.01)

(58) Field of Classification Search
CPC .................. C08L 23/16; C08L 2205/025
See application file for complete search history.

(56) References Cited

U.S. PATENT DOCUMENTS

| | | | |
|---|---|---|---|
| 9,994,095 B2 | 6/2018 | Sato et al. | |
| 10,160,819 B2 | 12/2018 | LiPiShan et al. | |
| 10,723,871 B2 | 7/2020 | Han et al. | |
| 2009/0299116 A1 | 12/2009 | Konze et al. | |
| 2019/0055422 A1 | 2/2019 | Brennan et al. | |

FOREIGN PATENT DOCUMENTS

| | | |
|---|---|---|
| EP | 2925798 A1 | 10/2015 |
| EP | 3464395 A1 | 4/2019 |
| WO | 2007136494 | 11/2007 |

(Continued)

OTHER PUBLICATIONS

Office action cited in corresponding Japanese application: 2022-518782 dated Oct. 3, 2024.

(Continued)

*Primary Examiner* — Shane Fang
(74) *Attorney, Agent, or Firm* — Karen L. Beckman (57) ABSTRACT

The invention provides a composition comprising an interpolymer composition, and wherein the interpolymer composition comprises a first ethylene/alpha-olefin/nonconjugated polyene interpolymer; and a second ethylene/alpha-olefin/nonconjugated polyene interpolymer; and wherein the interpolymer composition has a Mooney Viscosity (ML(1+4), 125° C.)<50, and a Rheology Parameter, ((RR/Mn)×1000)≥0.60.

14 Claims, 1 Drawing Sheet

(56) References Cited

FOREIGN PATENT DOCUMENTS

| WO | 2011008837 | 1/2011 |
| WO | 2013096573 | 6/2013 |
| WO | 2014084893 | 6/2014 |
| WO | 2017210195 | 12/2017 |
| WO | 2018005852 | 1/2018 |

OTHER PUBLICATIONS

Krmelova, "Evaluation of effect of white fillers on selected properties of EPDM blend," 2016, vol. 136, p. 336-340.
Oggermuller, "Vergleich Mineralischer Fullstoffe in Isolierenden Karosseriedichtprofilen," 2003, vol. 53 No. 1 p. 31-37.
Polestar, "The Application of Mineral Science Polestar 200R Calcined Clay in EPDM Rubber," 2018.
Polestar, "The Application of Mineral Science Polestar 200R in Rubber," 2017.
SILFITZ91, "Technical Data Sheet—Field of application: Elastomers," 2007.
PCT/US2020/051874, International Search Report and Written Opinion with a mailing date of Dec. 10, 2020.

US 12,448,506 B2

POLYMER COMPOSITIONS FOR EXTRUDED PROFILES

CROSS-REFERENCE TO RELATED APPLICATIONS

The present application claims benefit of priority to U.S. Application No. 62/905,016, filed on Sep. 24, 2019, which is incorporated herein by reference in its entirety.

BACKGROUND OF THE INVENTION

Ethylene-propylene-diene (EPDM) elastomers are widely used in rubber formulations for automotive weather strips, such as door, window, sunroof, trunk and hood profiles. EPDM-based formulations can provide good mechanical strength and modulus, excellent low temperature flexibility, good weatherability, and good extrusion performance. These properties are key technical requirements for weather strip manufacturers. The molecular features of the elastomer will affect the final physical properties of profiles, which are typically formed by extrusion processes. A profile may contain a Glass-Run Channel (GRC) and a Belt Line Seal (BLS), each of which consists of a hard-structural part to strengthen and support the profile. These profile features also require that the elastomer compositions have high hardness, high modulus, high filler acceptance, and fast curing rates, all while maintaining an excellent balance of other mechanical properties. There is a need for new and improved elastomer compositions that can meet the current demands of the supported profiles.

Some conventional elastomer compositions are described in the following patent references. International Publication WO2014/084893 discloses two ethylene/alpha-olefin/nonconjugated polyene interpolymers, and compositions containing the same. The compositions are used to form vulcanized rubber, and provide improved mixing, processability and mechanical properties. International Publication WO2013/096573 discloses solution polymerizations of ethylene/alpha-olefin/nonconjugated polyene interpolymers with rheology ratios greater than, or equal to, 20. These interpolymers can be produced at higher temperatures, and thus at lower viscosities. See also International Publication WO2007/136494 (an additional polymerization of ethylene/alpha-olefin/nonconjugated polyene interpolymers). International Publication WO2011/008837 discloses compositions containing two ethylene/alpha-olefin/nonconjugated polyene interpolymers. These compositions can be used to form weather strips with excellent mechanical properties and a high degree of consistency.

However, there remains a need for elastomer compositions that have high hardness, high modulus, a high filler loading and fast curing rates, and which can be used to form extruded profiles that meet increasing structural demands for weather strips. These needs have been met by the following invention.

SUMMARY OF THE INVENTION

A composition comprising an interpolymer composition, and
wherein the interpolymer composition comprises a first ethylene/alpha-olefin/nonconjugated polyene interpolymer; and a second ethylene/alpha-olefin/nonconjugated polyene interpolymer; and
wherein the interpolymer composition has a Mooney Viscosity (ML(1+4), 125° C.)<50, and a Rheology Parameter, ((RR/Mn)×1000), ≥0.60.

DETAILED DESCRIPTION OF THE INVENTION

Polymer compositions have been discovered that provide excellent hardness, high mechanical strength, high filler loading and dispersion, and fast cure rates. As discussed above, each composition comprises an interpolymer composition, and
wherein the interpolymer composition comprises a first ethylene/alpha-olefin/nonconjugated polyene interpolymer; and a second ethylene/alpha-olefin/nonconjugated polyene interpolymer; and
wherein the interpolymer composition has a Mooney Viscosity (ML(1+4), 125° C.)<50, and a Rheology Parameter, ((RR/Mn)×1000), ≥0.60. An inventive composition may comprise a combination of two or more embodiments, each described herein.

As used herein, the Rheology Parameter, ((RR/Mn)×1000), is an indication of the compositional properties (for example, molecular weight, MWD, long chain branching) of the interpolymer composition that provide a good balance of mechanical properties and processability of the composition.

In regard to the interpolymer composition, the second ethylene/alpha-olefin/nonconjugated polyene interpolymer differs from the first ethylene/alpha-olefin/nonconjugated polyene interpolymer in at least one property selected from Mn, Mw, Mz, MWD, Mooney Viscosity, V0.1, V100, RR, or any combination thereof, and further Mn, Mw, Mz, MWD, or any combination thereof.

In one embodiment, or a combination of two or more embodiments, each described herein, the interpolymer composition has a Rheology Parameter, ((RR/Mn)×1000), ≥0.62, or ≥0.64, or ≥0.66, or ≥0.68, or ≥0.70. In one embodiment, or a combination of two or more embodiments, each described herein, the interpolymer composition has a Rheology Parameter, ((RR/Mn)×1000), ≤2.00, or ≤1.90, or ≤1.80, or ≤1.70, or ≤1.60.

In one embodiment, or a combination of two or more embodiments, each described herein, the interpolymer composition has a Mooney Viscosity (ML(1+4), 125° C.)≤48, or ≤46, or ≤44, or ≤42, or ≤40, or ≤38, or ≤36, or ≤34, or ≤32. In one embodiment, or a combination of two or more embodiments, each described herein, the interpolymer composition has a Mooney Viscosity (ML(1+4), 125° C.)≥10, or ≥12, or ≥14, or ≥16, or ≥18, or ≥20, or ≥22, or ≥24, or ≥26, or ≥28.

In one embodiment, or a combination of two or more embodiments, each described herein, the interpolymer composition has a RR/MWD ratio ≥4.40, or ≥4.60, or ≥4.80, or ≥5.00, or ≥5.10, or ≥5.20, or ≥5.30. In one embodiment, or a combination of two or more embodiments, each described herein, the interpolymer composition has a RR/MWD ratio ≤6.60, or ≤6.40, or ≤6.20, or ≤6.00, or ≤5.90, or ≤5.80, or ≤5.70.

In one embodiment, or a combination of two or more embodiments, each described herein, the interpolymer composition has a molecular weight distribution MWD≥3.60, ≥3.80, or ≥4.00, or ≥4.20, or ≥4.40, or ≥4.50. In one embodiment, or a combination of two or more embodiments, each described herein, the interpolymer composition has a molecular weight distribution MWD≤8.00, or ≤7.80, or ≤7.60, or ≤7.40, or ≤7.20, or ≤7.00.

In one embodiment, or a combination of two or more embodiments, each described herein, the interpolymer composition has a ratio {[(RR/Mn)×1000]$_{Interpolymer\ composition}$/[(RR/Mn)×1000]$_{First\ Interpolymer}$}≥2.00, or ≥2.10, or ≥2.20, or ≥2.30, or ≥2.40, or ≥2.50.

In one embodiment, or a combination of two or more embodiments, each described herein, the interpolymer composition has a ratio {[(RR/Mn)×1000]$_{Interpolymer\ composition}$/[(RR/Mn)×1000]$_{First\ Interpolymer}$}≤4.00, or ≤3.90, or ≤3.80, or ≤3.70.

In one embodiment, or a combination of two or more embodiments, each described herein, the interpolymer composition has a ratio {[RR/MWD]$_{First\ Interpolymer}$/[RR/MWD]$_{Interpolymer\ composition}$}≥2.50, or ≥2.60, or ≥2.70, or ≥2.80, or ≥2.90, or ≥3.00. In one embodiment, or a combination of two or more embodiments, each described herein, the interpolymer composition has a ratio {[RR/MWD]$_{First\ Interpolymer}$/[RR/MWD]$_{Interpolymer\ composition}$}≤6.00, or ≤5.90, or ≤5.80, or ≤5.70, or ≤5.60, or ≤5.50, or ≤5.40, or ≤5.30, or ≤5.20, or ≤5.10.

In one embodiment, or a combination of two or more embodiments, each described herein, the interpolymer composition has a ratio {[MWD]$_{Interpolymer\ composition}$/[MWD]$_{First\ Interpolymer}$}≥1.50, or ≥1.60, or ≥1.70, or ≥1.80, or ≥1.90, or ≥2.00. In one embodiment, or a combination of two or more embodiments, each described herein, the interpolymer composition has a ratio {[MWD]$_{Interpolymer\ composition}$/[MWD]$_{First\ Interpolymer}$}≤3.50, or ≤3.40, or ≤3.30, or ≤3.20, or ≤3.10.

In one embodiment, or a combination of two or more embodiments, each described herein, the interpolymer composition has a ratio {[Mn]$_{First\ Interpolymer}$/[Mn]$_{Interpolymer\ composition}$}≥3.00, or ≥3.10, or ≥3.20, or ≥3.30, or ≥3.40, or ≥3.50, or ≥3.60, or ≥3.70. In one embodiment, or a combination of two or more embodiments, each described herein, the interpolymer composition has a ratio {[Mn]$_{First\ Interpolymer}$/[Mn]$_{Interpolymer\ composition}$}≤7.00, or ≤6.90, or ≤6.80, or ≤6.70, or ≤6.60, or ≤6.50, or ≤6.40, or ≤6.30, or ≤6.20, or ≤6.10.

In one embodiment, or a combination of two or more embodiments, each described herein, the first ethylene/alpha-olefin/nonconjugated polyene interpolymer (first interpolymer) is a first EPDM and the second ethylene/alpha-olefin/nonconjugated polyene interpolymer (second interpolymer) is a second EPDM; and wherein the second EPDM differs from the first EPDM in at least one property selected from Mn, Mw, Mz, MWD, Mooney Viscosity, V0.1, V100, RR, or any combination thereof, and further Mn, Mw, Mz, MWD, or any combination thereof. In one embodiment, or a combination of two or more embodiments, each described herein, the nonconjugated polyene of the first interpolymer is ENB; and the nonconjugated polyene of the second interpolymer is ENB. In one embodiment, or a combination of two or more embodiments, each described herein, the average of the ENB content of the first interpolymer and the ENB content of the second interpolymer is ≥5.2 wt %, or ≥5.4 wt %, or ≥5.6 wt %, or ≥5.8 wt %, or ≥6.0 wt %, or ≥6.2 wt %, or ≥6.4 wt %, or ≥6.5 wt %. In one embodiment, or a combination of two or more embodiments, each described herein, the average of the ENB content of the first interpolymer and the ENB content of the second interpolymer is ≤7.2 wt %, or ≤7.1 wt %, or ≤7.0 wt %, or ≤6.9 wt %, or ≤6.8 wt %, or ≤6.7 wt %. Note, the "average of the ENB content of the first interpolymer and the ENB content of the second interpolymer" is a wt % based on the sum weight of the first interpolymer and the second interpolymer; and the "ENB content of the first interpolymer" is a wt % based on the weight of the first interpolymer. It is understood that the ENB content is in polymerized form.

In one embodiment, or a combination of two or more embodiments, each described herein, the interpolymer composition comprises ≥90.0 wt %, or ≥92.0 wt %, or ≥94.0 wt %, or ≥96.0 wt %, or ≥98.0 wt %, or ≥99.0 wt %, or ≥99.5 wt %, of the first interpolymer and the second interpolymer, based on the weight of the interpolymer composition. In one embodiment, or a combination of two or more embodiments, each described herein, the interpolymer composition comprises ≤100.0 wt %, or ≤99.9 wt %, or ≤99.8 wt %, of the first interpolymer and the second interpolymer, based on the weight of the interpolymer composition.

In one embodiment, or a combination of two or more embodiments, each described herein, the first ethylene/alpha-olefin/nonconjugated polyene interpolymer and/or the second first ethylene/alpha-olefin/nonconjugated polyene interpolymer each independently comprises 50 wt % or a majority amount of polymerized ethylene, based on the weight of the respective interpolymer. In a further embodiment, each interpolymer is independently an EPDM. In a further embodiment, each diene is ENB.

In one embodiment, or a combination of two or more embodiments, each described herein, the first ethylene/alpha-olefin/nonconjugated polyene interpolymer (first interpolymer) has a Rheology Parameter, ((RR/Mn)×1000) ≥0.10, or ≥0.15, or ≥0.20, or ≥0.25, or ≥0.30. In one embodiment, or a combination of two or more embodiments, each described herein, the first interpolymer has a Rheology Parameter, ((RR/Mn)×1000) ≤0.60, or ≤0.55, or ≤0.50, or ≤0.45.

In one embodiment, or a combination of two or more embodiments, each described herein, the composition further comprises a calcined filler formed from a filler composition comprising a kaolinite. In a further embodiment, the filler composition further comprises a silica.

In one embodiment, or a combination of two or more embodiments, each described herein, the composition further comprises a crosslinking agent.

The invention also provides a crosslinked composition formed from the composition of any one embodiment, or a combination of two or more embodiments, each described herein.

In one embodiment, or a combination of two or more embodiments, each described herein, the composition has a Shore A Hardness ≥70, or ≥71, or ≥72, or ≥73; in a further embodiment, the Shore A Hardness is ≤95. In one embodiment, or a combination of two or more embodiments, each described herein, the composition has a Maximum Tensile Strength ≥4 MPa, or ≥5 MPa, or ≥6 MPa; in a further embodiment, the Maximum Tensile Strength is ≤16 MPa.

The invention also provides an article comprising at least one component formed from the composition of any one embodiment, or a combination of two or more embodiments described herein. In one embodiment, or a combination of two or more embodiments, each described herein, the article is an automotive part. In one embodiment, or a combination of two or more embodiments, each described herein, the article is an extruded article (for example, an extruded profile), an injected molded article, or a thermoformed article. In a further embodiment, the article is an extruded article (for example, an extruded profile).

In one embodiment, or a combination of two or more embodiments, each described herein, the article is selected from a weather strip, a hose (for example, an automotive hose), a belt (for example, an automotive belt), a building material, a roofing membrane, a wire and cable jacket, a flooring material, a computer part, a gasket, or a tire.

The inventive composition may comprise a combination of two or more embodiments, each described herein. The interpolymer composition may comprise a combination of two or more embodiments, each described herein. The first ethylene/alpha-olefin/nonconjugated polyene interpolymer (first interpolymer) may comprise a combination of two or more embodiments, each described herein. The second ethylene/alpha-olefin/nonconjugated polyene interpolymer (second interpolymer) may comprise a combination of two or more embodiments, each described herein.

Ethylene/Alpha-Olefin/Nonconjugated Polyene Interpolymers

The first ethylene/alpha-olefin/nonconjugated polyene interpolymer and the second ethylene/alpha-olefin/nonconjugated polyene interpolymer, each as described herein, independently comprise, in polymerize form, ethylene, an alpha-olefin, and a nonconjugated polyene. The alpha-olefin may be either an aliphatic or an aromatic compound. The alpha-olefin is preferably a C3-C20 aliphatic compound, preferably a C3-C16 aliphatic compound, and more preferably a C3-C10 aliphatic compound. Preferred C3-C10 aliphatic alpha-olefins include propylene, 1-butene, 1-hexene, 1-octene and 1-decene, and more preferably propylene. In one embodiment, or a combination of two or more embodiments, each described herein, each interpolymer is independently an ethylene/propylene/nonconjugated diene (EPDM) terpolymer. In a further embodiment, each diene is 5-ethylidene-2-norbornene (ENB).

Suitable examples of nonconjugated polyenes include the C4-C40 nonconjugated dienes. Illustrative nonconjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-hexadiene, 7-methyl-1,6-octadiene, 3,7-dimethyl-1,6-octadiene, 3,7-dimethyl-1,7-octadiene, 5,7-dimethyl-1,7-octadiene, 1,9-deca-diene, and mixed isomers of dihydromyrcene; single ring alicyclic dienes such as 1,4-cyclo-hexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene (VNB), 5-propenyl-2-norbornene, 5-isopropylidene-2-norbornene, 5-(4-cyclopentenyl)-2-norbornene, and 5-cyclohexylidene-2-norbornene. The polyene is preferably a nonconjugated diene selected from the group consisting of ENB, VNB, dicyclopentadiene, 1,4-hexadiene, 7-methyl-1,6-octadiene, and preferably, ENB, VNB, dicyclopentadiene and 1,4-hexadiene, more preferably ENB, VNB and dicyclopentadiene, and even more preferably ENB.

In one embodiment, or a combination of two or more embodiments, each described herein, each ethylene/alpha-olefin/nonconjugated polyene interpolymer independently comprises 50 wt % or a majority amount of polymerized ethylene, based on the weight of the interpolymer. In a further embodiment, each ethylene/alpha-olefin/nonconjugated polyene interpolymer is independently an ethylene/alpha-olefin/nonconjugated dene interpolymer. In a further embodiment, each interpolymer is independently an EPDM. In a further embodiment, the diene is ENB.

An ethylene/alpha-olefin/nonconjugated polyene interpolymer may comprise a combination of two or more embodiments as described herein. An ethylene/alpha-olefin/nonconjugated diene interpolymer may comprise a combination of two or more embodiments as described herein. An EPDM terpolymer may comprise a combination of two or more embodiments as described herein.

Crosslinking Agents, Oils and Other Additives

Crosslinking agents include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; peroxides, such as di-tertbutyl peroxide, tert-butylcumyl peroxide, dicumyl peroxide, 2,5-dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane. Sulfur can be a crystalline elemental sulfur or an amorphous elemental sulfur, and either type can be in pure form or supported on an inert carrier. An example of a supported sulfur is RHENOGRAN S-80 (80% S and 20% inert carrier) from Rhein Chemie. The sulfur containing compounds are the preferred crosslinking agents.

Oils include, but are not limited to, paraffin oils, naphthenic oils and polyalkylbenzene oils. In one embodiment, or a combination of two or more embodiments, each described herein, the oil is selected from the group consisting of nonaromatic oils, paraffinic oils, naphthenic oils, and combinations thereof. Suitable oils include, but are not limited to, SUNPAR 2280, PARALUX 6001, HYDROBRITE 550, and CALSOL 5550, and preferably SUNPAR 2280.

An inventive composition may comprise one or more additional additives. Suitable additives include, but are not limited to, fillers, stabilizers (for example, antioxidants, antiozonants, UV stabilizers), flame retardants, colorants or pigments, and combinations thereof. Fillers include, but are not limited to, calcined fillers, carbon black (for example, SPHERON 6000A, SPHERON 5000A, SPHERON 6400A, and THERMAX N-990), silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; natural fibers, synthetic fibers, and the like. An inventive composition preferably comprises at least one calcined filler and carbon black. Some stabilizers include, but are not limited to, hindered phenols, bisphenols, and thiobisphenols, and substituted hydroquinones. Typically, one or more stabilizers, in "ppm" amounts, are added to a polymer or a polymer composition.

In one embodiment, or a combination of two or more embodiments, each described herein, an inventive composition further comprises a thermoplastic polymer, different from each of the first interpolymer and the second interpolymer, independently, in one or more features, such as monomer(s) types and/or amounts, Mn, Mw, Mz, MWD, Mooney Viscosity, V0.1, V100, RR, or any combination thereof. Polymers include, but not limited to, ethylene-based polymers, propylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra-low density polyethylene (ULDPE), homogeneously branched linear ethylene polymers, and homogeneously branched substantially linear ethylene polymers (that is homogeneously branched, long chain branched ethylene polymers). Suitable propylene-base polymers include, but are not limited to, polypropylene homopolymers and propylene/ethylene copolymers.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "propylene-based polymer," as used herein, refers to a polymer that comprises, in polymerized form, a majority weight percent of propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene/alpha-olefin/nonconjugated polyene interpolymer," as used herein, refers to an interpolymer that comprises, in polymerized form, ethylene, an alpha-olefin, and a nonconjugated polyene. In one embodiment, the "ethylene/alpha-olefin/nonconjugated polyene interpolymer," comprises 50 wt % or a majority weight percent of ethylene (based on the weight of the interpolymer).

The term "ethylene/a-olefin/nonconjugated diene interpolymer," as used herein, refers to an interpolymer that comprises, in polymerized form, ethylene, an alpha-olefin, and a nonconjugated diene. In one embodiment, the "ethylene/alpha-olefin/nonconjugated diene interpolymer," comprises 50 wt % or a majority weight percent of ethylene (based on the weight of the interpolymer).

The term, "ethylene/alpha-olefin copolymer," as used herein, refers to a copolymer that comprises, in polymerized form, 50 wt % or a majority amount of ethylene monomer (based on the weight of the copolymer), and an alpha-olefin, as the only two monomer types.

The term "calcined," as used herein, in reference to fillers, refers to the heat treatment of a filler, which treatment takes place at a temperature ≥600° C., and typically up to a temperature ≤1050° C. Such a heat treatment may take place in a furnace. The filler may be heated so to oxidize, remove moisture, and/or reduce to a loose state (calx), but not to melt. Typically, the calcination process removes the crystallization water and crystallinity of a hydrous material.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure, not specifically delineated or listed.

Listing of Some Composition Features a) A composition comprising an interpolymer composition, and
wherein the interpolymer composition comprises a first ethylene/alpha-olefin/nonconjugated polyene interpolymer (first interpolymer); and a second ethylene/alpha-olefin/nonconjugated polyene interpolymer (second interpolymer); and
wherein the interpolymer composition has a Mooney Viscosity (ML(1+4), 125° C.) ≤50, and a Rheology Parameter, ((RR/Mn)×1000), ≥0.60.

b) The composition of a) above, wherein the interpolymer composition has a Rheology Parameter, ((RR/Mn)×1000), ≥0.62, or ≥0.64, or ≥0.66, or ≥0.68, or ≥0.70.

c) The composition of a) or b) above, wherein the interpolymer composition has a Rheology Parameter, ((RR/Mn)×1000), ≤2.00, or ≤1.90, or ≤1.80, or ≤1.70, or ≤1.60.

d) The composition of any one of a)-c) [a) through c)] above, wherein the interpolymer composition has a Mooney Viscosity (ML(1+4), 125° C.) ≤48, or ≤46, or ≤44, or ≤42, or ≤40, or ≤38, or ≤36, or ≤34, or ≤32.

e) The composition of any one of a)-d) above, wherein the interpolymer composition has a Mooney Viscosity (ML(1+4), 125° C.) ≥10, or ≥12, or ≥14, or ≥16, or ≥18, or ≥20, or ≥22, or ≥24, or ≥26, or ≥28.

f) The composition of any one of a)-e) above, wherein the interpolymer composition has a RR/MWD ratio ≥4.40, or ≥4.60, or ≥4.80, or ≥5.00, or ≥5.10, or ≥5.20, or ≥5.30.

g) The composition of any one of a)-f) above, wherein the interpolymer composition has a RR/MWD ratio ≤6.60, or ≤6.40, or ≤6.20, or ≤6.00, or ≤5.90, or ≤5.80, or ≤5.70.

h) The composition of any one of a)-g) above, wherein the interpolymer composition has a molecular weight distribution MWD ≥3.60, or ≥3.80, or ≥4.00, or ≥4.20, or ≥4.40, or ≥4.50.

i) The composition of any one of a)-h) above, wherein the interpolymer composition has a molecular weight distribution MWD≤8.00, or ≤7.80, or ≤7.60, or ≤7.40, or ≤7.20, or ≤7.00.

j) The composition of any one of a)-i) above, wherein the d interpolymer composition has a number average molecular weight Mn ≥10,000 g/mol, or ≥12,000 g/mol, or ≥14,000 g/mol, or ≥16,000 g/mol, or ≥18,000 g/mol, or ≥20,000 g/mol.

k) The composition of any one of a)-j) above, wherein the interpolymer composition has a number average molecular weight Mn ≤50,000 g/mol, or ≤45,000 g/mol, or ≤40,000 g/mol, or ≤35,000 g/mol, or ≤30,000 g/mol.

l) The composition of any one of a)-k) above, wherein the interpolymer composition has a weight average molecular weight Mw ≥90,000 g/mol, or ≥100,000 g/mol, or ≥110,000 g/mol, or ≥120,000 g/mol, or ≥130,000 g/mol.

m) The composition of any one of a)-l) above, wherein the interpolymer composition has a weight average molecular weight Mw ≤300,000 g/mol, or ≤280,000 g/mol, or ≤260,000 g/mol, or ≤240,000 g/mol, or ≤220,000 g/mol, or ≤200,000 g/mol, or ≤180,000 g/mol.

n) The composition of any one of a)-m) above, wherein the interpolymer composition has a z-average molecular weight Mz ≥350,000 g/mol, or ≥360,000 g/mol, or ≥370,000 g/mol, or ≥380,000 g/mol, or ≥390,000 g/mol.

o) The composition of any one of a)-n) above, wherein the interpolymer composition has a z-average molecular weight Mz ≤600,000 g/mol, or ≤595,000 g/mol, or ≤590,000 g/mol, or ≤585,000 g/mol, or ≤580,000 g/mol, or ≤575,000 g/mol.

p) The composition of any one of a)-o) above, wherein the interpolymer composition has a molecular weight ratio Mz/Mn ≥10.0, or ≥11.0, or ≥12.0, or ≥13.0.

q) The composition of any one of a)-p) above, wherein the interpolymer composition has a molecular weight ratio Mz/Mn ≤30.0, or ≤29.0, or ≤28.0, or ≤27.0, or ≤26.0, or ≤25.0.

r) The composition of any one of a)-q) above, wherein the interpolymer composition has a molecular weight ratio Mz/Mw ≥2.70, or ≥2.75, or ≥2.80, or ≥2.85, or ≥2.90, or ≥2.95.

s) The composition of any one of a)-r) above, wherein the interpolymer composition has a molecular weight ratio Mz/Mw ≤4.00, or ≤3.95, or ≤3.90, or ≤3.85, or ≤3.80, or ≤3.75, or ≤3.70.

t) The composition of any one of a)-s) above, wherein the interpolymer composition has a ratio $\{[(RR/Mn) \times 1000]_{Interpolymer\ composition}/[(RR/Mn) \times 1000]_{First\ Interpolymer}\} \geq 2.00$, or 2.10, or ≥2.20, or ≥2.30, or ≥2.40, or ≥2.50.

u) The composition of any one of a)-t) above, wherein the interpolymer composition has a ratio $\{[(RR/Mn) \times 1000]_{Interpolymer\ composition}/[(RR/Mn) \times 1000]_{First\ Interpolymer}\} \leq 5\ 4.00$, or ≤3.90, or ≤3.80, or ≤3.70.

v) The composition of any one of a)-u) above, wherein the interpolymer composition has a ratio $\{[(RR/Mn) \times 1000]_{First\ Interpolymer}/[(RR/Mn) \times 1000]_{Interpolymer\ composition}\} \geq 2.50$, or ≥2.60, or ≥2.70, or ≥2.80, or ≥2.90, or ≥3.00.

w) The composition of any one of a)-v) above, wherein the interpolymer composition has a ratio $\{[(RR/MWD)]_{First\ Interpolymer}/[RR/MWD]_{Interpolymer\ composition}\} \leq 6.00$, or ≤5.90, or ≤5.80, or ≤5.70, or ≤5.60, or ≤5.50, or ≤5.40, or ≤5.30, or ≤5.20, or ≤5.10.

x) The composition of any one of a)-w) above, wherein the interpolymer composition has a ratio $\{[(MWD)]_{Interpolymer\ composition}/[MWD]_{First\ Interpolymer}\} \geq 1.50$, or ≥1.60, or ≥1.70, or ≥1.80, or ≥1.90, or ≥2.00.

y) The composition of any one of a)-x) above, wherein the interpolymer composition has a ratio $\{[MWD]_{Interpolymer\ composition}/[MWD]_{First\ Interpolymer}\} \leq 3.50$, or ≤3.40, or ≤3.30, or ≤3.20, or ≤3.10.

z) The composition of any one of a)-y) above, wherein the interpolymer composition has a ratio $\{[Mn]_{First\ Interpolymer}/[Mn]_{Interpolymer\ composition}\} \geq 3.00$, or ≥3.10, or ≥3.20, or ≥3.30, or ≥3.40, or ≥3.50, or ≥3.60, or ≥3.70.

aa) The composition of any one of a)-z) above, wherein the interpolymer composition has a ratio $\{[Mn]_{First\ Interpolymer}/[Mn]_{Interpolymer\ composition}\} \leq 7.00$, or ≤6.90, or ≤6.80, or ≤6.70, or ≤6.60, or ≤6.50, or ≤6.40, or ≤6.30, or ≤6.20, or ≤6.10.

bb) The composition of any one of a)-aa) above, wherein the interpolymer composition has a ratio $\{[Mw]_{First\ Interpolymer}/[Mw]_{Interpolymer\ composition}\} 1.50$, or ≥1.60, or ≥1.70, or ≥1.80.

cc) The composition of any one of a)-bb) above, wherein the interpolymer composition has a ratio $\{[Mw]_{First\ Interpolymer}/[Mw]_{Interpolymer\ composition}\} \leq 2.30$, or ≤2.20, or ≤2.10, or ≤2.00.

dd) The composition of any one of a)-cc) above, wherein the interpolymer composition has a ratio $\{[Mz]_{First\ Interpolymer}/[MZ]_{Interpolymer\ composition}\} 0.90$, or ≥0.95, or ≥1.00, or ≥1.05, or ≥1.10.

ee) The composition of any one of a)-dd) above, wherein the interpolymer composition has a ratio $\{[Mz]_{First\ Interpolymer}/[MZ]_{Interpolymer\ composition}\} \leq 1.40$, or ≤1.35, or ≤1.30, or ≤1.25, or ≤1.20.

ff) The composition of any one of a)-ee) above, wherein the interpolymer composition has a V0.1 (0.1 rad/s, 190° C.) ≥34,000 Pa·s, or ≥36,000 Pa·s, or ≥38,000 Pa·s, or ≥40,000 Pa·s, or ≥42,000 Pa·s, or ≥44,000 Pa·s, or ≥46,000 Pa·s, or ≥48,000 Pa·s, or ≥50,000 Pa·s.

gg) The composition of any one of a)-ff) above, wherein the interpolymer composition has a V0.1 (0.1 rad/s, 190° C.) ≤86,000 Pa·s, or ≤84,000 Pa·s, or ≤82,000 Pa·s, or ≤80,000 Pa·s, or ≤78,000 Pa·s, or ≤76,000 Pa·s, or ≤74,000 Pa·s, or ≤72,000 Pa·s, or ≤70,000 Pa·s.

hh) The composition of any one of a)-gg) above, wherein the interpolymer composition has a V100 (100 rad/s, 190° C.) ≥1,400 Pa·s, or ≥1,500 Pa·s, or ≥1,600 Pa·s, or ≥1,700 Pa·s, or ≥1,800 Pa·s.

ii) The composition of any one of a)-hh) above, wherein the interpolymer composition has a V100 (100 rad/s, 190° C.) ≤2,500 Pa·s, or ≤2,400 Pa·s, or ≤2,300 Pa·s, or ≤2,200 Pa·s, or ≤2,100 Pa·s.

jj) The composition of any one of a)-ii) above, wherein the interpolymer composition has a Rheology Ratio (RR) ≥20.0, or ≥21.0, or ≥22.0, or ≥23.0, or ≥24.0, or ≥25.0.

kk) The composition of any one of a)-jj) above, wherein the interpolymer composition has a Rheology Ratio (RR) ≤50.0, or ≤45.0, or ≤40.0, or ≤39.0, or ≤38.0, or ≤37.0.

ll) The composition of any one of a)-kk) above, wherein the interpolymer composition has a tan delta ≥0.9, or ≥1.0, or ≥, or ≥1.1, or ≥1.2, or ≥1.3.

mm) The composition of any one of a)-ll) above, wherein the interpolymer composition has a tan delta ≤2.2, or ≤2.1, or ≤2.0, or ≤1.9, or ≤1.8, or ≤1.7.

nn) The composition of any one of a)-mm) above, wherein the interpolymer composition has a delta delta ≥16.0, or ≥18.0, or ≥20.0, or ≥22.0.

oo) The composition of any one of a)-nn) above, wherein the interpolymer composition has a delta delta ≤30.0, or ≤28.0, or ≤26.0, or ≤24.0.

pp) The composition of any one of a)-oo) above, wherein the interpolymer composition has a ratio $\{[V0.1]_{First\ Interpolymer}/[V0.1]_{Interpolymer\ composition}\} 5.80$, or ≥5.85, or ≥5.90, or ≥5.95, or ≥6.00, or ≥6.05.

qq) The composition of any one of a)-pp) above, wherein the interpolymer composition has a ratio $\{[V0.1]_{First\ Interpolymer}/[V0.1]_{Interpolymer\ composition}\} \leq 8.50$, or ≤8.45, or ≤8.40, or ≤8.35, or ≤8.30, or ≤8.25.

n) The composition of any one of a)-qq) above, wherein the interpolymer composition has a ratio $\{[V100]_{First\ Interpolymer}/[V100]_{Interpolymer\ composition}\} \geq 3.80$, or ≥3.85, or ≥3.90, or ≥3.95, or ≥4.00, or ≥4.05, or ≥4.10.

ss) The composition of any one of a)-rr) above, wherein the interpolymer composition has a ratio $\{[V100]_{First\ Interpolymer}/[V100]_{Interpolymer\ composition}\} \leq 5.30$, or ≤5.25, or ≤5.20, or ≤5.15, or ≤5.10, or ≤5.05.

tt) The composition of any one of a)-ss) above, wherein the interpolymer composition has a ratio $\{[RR]_{First\ Interpolymer}/[RR]_{Interpolymer\ composition}\} \geq 1.20$, or ≥1.25, or ≥1.30, or ≥1.35, or ≥1.40, or ≥1.45.

uu) The composition of any one of a)-tt) above, wherein the interpolymer composition has a ratio $\{[RR]_{First\ Interpolymer}/[RR]_{Interpolymer\ composition}\} \leq 1.80$, or ≤1.75, or ≤1.70, or ≤1.65, or ≤1.60, or ≤1.55.

vv) The composition of any one of a)-uu) above, wherein the first ethylene/alpha-olefin/nonconjugated polyene interpolymer (first interpolymer) is a first EPDM and the second ethylene/alpha-olefin/nonconjugated polyene interpolymer (second interpolymer) is a second EPDM; and wherein the second EPDM differs from the first EPDM in at least one property selected from Mn, Mw, Mz, MWD, Mooney Viscosity, V0.1, V100, RR, or any combination thereof, and further Mn, Mw, Mz, MWD, or any combination thereof.

ww) The composition of any one of a)-vv) above, wherein the nonconjugated polyene of the first interpolymer is ENB; and the nonconjugated polyene of the second interpolymer is ENB.

xx) The composition of ww) above, wherein the average of the ENB content of the first interpolymer and the ENB content of the second interpolymer is ≥5.4 wt %, or ≥5.6 wt %, or ≥5.8 wt %, or ≥6.0 wt %, or ≥6.2 wt %, or ≥6.4 wt %, or ≥6.5 wt %, based on the sum weight of the first and second interpolymers.

yy) The composition of ww) or xx) above, wherein the average of the ENB content of the first interpolymer and the ENB content of the second interpolymer is ≤7.2 wt %, or ≤7.1 wt %, or ≤7.0 wt %, or ≤6.9 wt %, or ≤6.8 wt %, or ≤6.7 wt %, based on the sum weight of the first and second interpolymers.

zz) The composition of any one of ww)-yy) above, wherein the ratio [(average of the ENB content of the first interpolymer and the ENB content of the second interpolymer)/(the ENB content of the first interpolymer)]≥0.90, or ≥0.95, or ≥1.00.

a3) The composition of any one of ww)-zz) above, wherein the ratio [(average of the ENB content of the first interpolymer and the ENB content of the second interpolymer)/(the ENB content of the first interpolymer)]≤1.20, or ≤1.15, or ≤1.10, or ≤1.05. Note, the "average of the ENB content of the first interpolymer and the ENB content of the second interpolymer" is a wt % based on the sum weight of the first interpolymer and the second interpolymer; and the "ENB content of the first interpolymer" is a wt % based on the weight of the first interpolymer. It is understood that the ENB content is in polymerized form.

b3) The composition of any one of a)-a3) above, wherein the average of the C2 (ethylene) content of the first interpolymer and the C2 (ethylene) content of the second interpolymer is ≥60.0 wt %, or ≥62.0 wt %, or ≥64.0 wt %, or ≥66.0 wt %, or ≥68.0 wt %, or ≥70.0 wt %, based on the sum weight of the first interpolymer and the second interpolymer.

c3) The composition of any one of a)-b3) above, wherein the average of the C2 (ethylene) content of the first interpolymer and the C2 (ethylene) content of the second interpolymer is ≤84.0 wt %, or ≤82.0 wt %, or ≤80.0 wt %, or ≤78.0 wt %, or ≤76.0 wt %, or ≤74.0 wt %, based on the sum weight of the first interpolymer and the second interpolymer. It is understood that the C2 (ethylene) content is in polymerized form.

d3) The composition of any one of a)-c3) above, wherein the interpolymer composition comprises ≥90.0 wt %, or ≥92.0 wt %, or ≥94.0 wt %, or ≥96.0 wt %, or ≥98.0 wt %, or ≥99.0 wt %, or ≥99.5 wt %, of the first interpolymer and the second interpolymer, based on the weight of the interpolymer composition.

e3) The composition of any one of a)-d3) above, wherein the interpolymer composition comprises ≤100.0 wt %, or ≤99.9 wt %, or ≤99.8 wt %, of the first interpolymer and the second interpolymer, based on the weight of the interpolymer composition.

f3) The composition of any one of a)-e3) above, wherein the interpolymer composition has a "13C NMR % Peak Area," which is the {[(13C NMR peak area from 21.3 ppm to 22.0 ppm) divided by the (total integral area from 19.5 ppm to 22.0 ppm)]×100}, that is ≥4.0%, or ≥5.0%, or ≥6.0%, or ≥7.0%, or ≥8.0%, or ≥9.0%, or ≥10.0%, or ≥11.0%, or ≥12.0%, as determined by 13C NMR.

g3) The composition of any one of a)-f3) above, wherein the interpolymer composition has a "13C NMR % Peak Area," that is ≤30.0%, or ≤25.0%, or ≤20.0%, as determined by 13C NMR.

h3) The composition of any one of a)-g3) above, wherein the interpolymer composition has a Tm value ≥50.0° C., or ≥55.0° C., or ≥60.0° C., or ≥62.0° C., or ≥64.0° C., or ≥66.0° C.

i3) The composition of any one of a)-h3) above, wherein the interpolymer composition has a Tm value ≤85.0° C., or ≤80.0° C., or ≤78.0° C., or ≤76.0° C., or ≤74.0° C., or ≤72.0° C., or ≤70.0° C.

j3) The composition of any one of a)-i3) above, wherein the interpolymer composition has a Tg value ≥−50.0° C., or ≥−48.0° C., or ≥−46.0° C., or ≥−44.0° C., or ≥−42.0° C., or ≥−40.0° C.

k3) The composition of any one of a)-j3) above, wherein the interpolymer composition has a Tg value ≤−20.0° C., or ≤−22.0° C., or ≤−24.0° C., or ≤−26.0° C., or ≤−28.0° C., or ≤−30.0° C.

l3) The composition of any one of a)-k3) above, wherein the interpolymer composition has a Tc value ≥40.0° C., or ≥42.0° C., or ≥46.0° C., or ≥48.0° C., or ≥50.0° C., or ≥52.0° C.

m3) The composition of any one of a)-l3) above, wherein the interpolymer composition has a Tc value ≤70.0° C., or ≤68.0° C., or ≤66.0° C., or ≤64.0° C., or ≤62.0° C., or ≤60.0° C.

n3) The composition of any one of a)-m3) above, wherein the interpolymer composition has a % crystallinity ≥8.0%, or ≥10.0%, or ≥12.0%, or ≥14.0%, or ≥16.0%.

o3) The composition of any one of a)-n3) above, wherein the interpolymer composition has a % crystallinity ≤30.0%, or ≤28.0%, or ≤26.0%, or ≤24.0%, or ≤22.0%, or ≤20.0%.

p3) The composition of any one of a)-o3) above, wherein the first ethylene/alpha-olefin/nonconjugated polyene interpolymer and/or the second first ethylene/alpha-olefin/nonconjugated polyene interpolymer each independently comprises 50 wt % or a majority amount of polymerized ethylene, based on the weight of the respective interpolymer. In a further embodiment, both interpolymers independently comprises 50 wt % or a majority amount of polymerized ethylene.

q3) The composition of p3) above, wherein each interpolymer is independently an EPDM. In a further embodiment, each diene is ENB.

r3) The composition of any one of a)-q3) above, wherein the first ethylene/alpha-olefin/nonconjugated polyene interpolymer (first interpolymer) has a Rheology Parameter, ((RR/Mn)×1000) ≥0.10, or ≥0.15, or ≥0.20, or ≥0.25, or ≥0.30.

s3) The composition of any one of a)-r3) above, wherein the first interpolymer has a Rheology Parameter, ((RR/Mn)×1000) ≤0.60, or ≤0.55, or ≤0.50, or ≤0.45.

t3) The composition of any one of a)-s3) above, wherein the first interpolymer has a RR/MWD ratio ≥10.0, or ≥11.0, or ≥12.0, or ≥13.0, or ≥14.0, or ≥15.0, or ≥16.0.

u3) The composition of any one of a)-t3) above, wherein the first interpolymer has a RR/MWD ratio ≤36.0, or ≤34.0, or ≤32.0, or ≤30.0, or ≤28.0, or ≤27.0.

v3) The composition of any one of a)-u3) above, wherein the first interpolymer has a molecular weight distribution MWD ≥1.80, or ≥1.90, or ≥2.00, or ≥2.10, or ≥2.20.

w3) The composition of any one of a)-v3) above, wherein the first interpolymer has a molecular weight distribution MWD ≤3.00, or ≤2.90, or ≤2.80, or ≤2.70, or ≤2.50, or ≤2.40, or ≤2.30.

x3) The composition of any one of a)-w3) above, wherein the first interpolymer has a number average molecular weight Mn ≥80,000 g/mol, or ≥85,000 g/mol, or ≥90,000 g/mol, or ≥95,000 g/mol, or ≥100,000 g/mol, or ≥105,000 g/mol.

y3) The composition of any one of a)-x3) above, wherein the first interpolymer has a number average molecular weight Mn ≤180,000 g/mol, or ≤170,000 g/mol, or ≤160,000 g/mol, or ≤155,000 g/mol, or ≤150,000 g/mol, or ≤145,000 g/mol.

z3) The composition of any one of a)-y3) above, wherein the first interpolymer has a weight average molecular weight Mw ≥200,000 g/mol, or ≥210,000 g/mol, or ≥220,000 g/mol, or ≥230,000 g/mol, or ≥240,000 g/mol.

a4) The composition of any one of a)-z3) above, wherein the first interpolymer has a weight average molecular weight Mw ≤360,000 g/mol, or ≤350,000 g/mol, or ≤340,000 g/mol, or ≤330,000 g/mol, or ≤320,000 g/mol.

b4) The composition of any one of a)-a4) above, wherein the first interpolymer has a z-average molecular weight Mz ≥400,000 g/mol, or ≥410,000 g/mol, or ≥420,000 g/mol, or ≥430,000 g/mol, or ≥440,000 g/mol, or ≥450,000 g/mol, or ≥460,000 g/mol.

c4) The composition of any one of a)-b4) above, wherein the first interpolymer has a z-average molecular weight Mz ≤700,000 g/mol, or ≤690,000 g/mol, or ≤680,000 g/mol, or ≤670,000 g/mol, or ≤660,000 g/mol, or ≤650,000 g/mol, or ≤640,000 g/mol.

d4) The composition of any one of a)-c4) above, wherein the first interpolymer has a molecular weight ratio Mz/Mn ≥4.00, or ≥4.05, or ≥4.10, or ≥4.15, or ≥4.20.

e4) The composition of any one of a)-d4) above, wherein the first interpolymer has a molecular weight ratio Mz/Mn ≤5.00, or ≤4.90, or ≤4.80, or ≤4.70, or ≤4.60.

f4) The composition of any one of a)-e4) above, wherein the first interpolymer has a molecular weight ratio Mz/Mw ≥1.60, or ≥1.65, or ≥1.70, or ≥1.75, or ≥1.80, or ≥1.85, ≥ or ≥1.90.

g4) The composition of any one of a)-f4) above, wherein the first interpolymer has a molecular weight ratio Mz/Mw ≤2.35, or ≤2.30, or ≤2.25, or ≤2.20, or ≤2.15, or ≤2.10, or ≤2.05.

h4) The composition of any one of a)-g4) above, wherein the first interpolymer has a V0.1 (0.1 rad/s, 190° C.) ≥280,000 Pa·s, or ≥285,000 Pa·s, or ≥290,000 Pa·s, or ≥295,000 Pa·s, or ≥300,000 Pa·s, or ≥305,000 Pa·s, or ≥310,000 Pa·s.

i4) The composition of any one of a)-h4) above, wherein the first interpolymer has a V0.1 (0.1 rad/s, 190° C.) ≤600,000 Pa·s, or ≤595,000 Pa·s, or ≤590,000 Pa·s, or ≤585,000 Pa·s, or ≤580,000 Pa·s, or ≤575,000 Pa·s.

j4) The composition of any one of a)-i4) above, wherein the first interpolymer has a V100 (100 rad/s, 190° C.) ≥6,000 Pa·s, or ≥6,500 Pa·s, or ≥7,000 Pa·s, or ≥7,500 Pa·s, or ≥8,000 Pa·s.

k4) The composition of any one of a)-j4) above, wherein the first interpolymer has a V100 (100 rad/s, 190° C.) ≤12,000 Pa·s, or ≤11,500 Pa·s, or ≤11,000 Pa·s, or ≤10,500 Pa·s, or ≤10,000 Pa·s, or ≤9,500 Pa·s.

l4) The composition of any one of a)-k4) above, wherein the first interpolymer has a Rheology Ratio (RR) ≥20.0, or ≥22.0, or ≥24.0, or ≥26.0, or ≥28.0, or ≥30.0, or ≥32.0, or ≥34.0, or ≥36.0.

m4) The composition of any one of a)-l4) above, wherein the first interpolymer has a Rheology Ratio (RR) ≤80.0, or ≤75.0, or ≤70.0, or ≤68.0, or ≤66.0, or ≤64.0, or ≤62.0.

n4) The composition of any one of a)-m4) above, wherein the first interpolymer has a tan delta ≥0.80, or ≥0.85, or ≥0.90, or ≥0.95, or ≥1.00, or ≥1.05.

o4) The composition of any one of a)-n4) above, wherein the first interpolymer has a tan delta ≤1.50, or ≤1.45, or ≤1.40, or ≤1.35, or ≤1.30, or ≤1.25, or ≤1.20.

p4) The composition of any one of a)-o4) above, wherein the first interpolymer has a delta delta ≥20.0, or ≥22.0, or ≥24.0, or ≥26.0.

q4) The composition of any one of a)-p4) above, wherein the first interpolymer has a delta ≤50.0, or ≤45.0, or ≤40.0, or ≤38.0, or ≤36.0, or ≤34.0, or ≤32.0, or ≤30.0.

r4) The composition of any one of a)-q4) above, wherein the first interpolymer is an EPDM.

s4) The composition of any one of a)-r4) above, wherein the nonconjugated polyene of the first interpolymer is ENB.

t4) The composition of s4) above, wherein the first interpolymer comprises, in polymerized form, ≥5.00 wt %, or ≥5.50 wt %, or ≥6.00 wt %, or ≥6.05 wt %, or ≥6.10 wt %, or ≥6.15 wt %, or ≥6.20 wt %, or ≥6.25 wt %, of ENB, based on the weight of the first interpolymer.

u4) The composition of s4) or t4) above, wherein the first interpolymer comprises, in polymerized form, ≤7.00 wt %, or ≤6.90 wt %, or ≤6.80 wt %, or ≤6.75 wt %, or ≤6.70 wt %, or ≤6.65 wt %, or ≤6.60 wt %, of ENB, based on the weight of the first interpolymer.

v4) The composition of any one of a)-u4) above, wherein the first interpolymer comprises, in polymerized form, ≥60.0 wt %, or ≥62.0 wt %, or ≥64.0 wt %, or ≥66.0 wt %, or ≥68.0 wt %, or ≥70.0 wt %, of C2 (ethylene), based on the weight of the first interpolymer.

w4) The composition of any one of a)-v4) above, wherein the first interpolymer comprises, in polymerized form, ≤84.0 wt %, or ≤82.0 wt %, or ≤80.0 wt %, or ≤78.0 wt %, or ≤76.0 wt %, or ≤74.0 wt %, of C2 (ethylene), based on the weight of the first interpolymer.

x4) The composition of any one of a)-w4) above, wherein the first interpolymer has a "13C NMR % Peak Area," which is the {[(13C NMR peak area from 21.3 ppm to 22.0 ppm) divided by the (total integral area from 19.5 ppm to 22.0 ppm)]×100}, that is ≥4.0%, or ≥5.0%, or ≥6.0%, or ≥7.0%, or ≥8.0%, or ≥9.0%, or ≥10.0%, or ≥11.0%, or ≥12.0%, as determined by 13C NMR.

y4) The composition of any one of a)-x4) above, wherein the first interpolymer has a "13C NMR % Peak Area," that is ≤30.0%, or ≤25.0%, or ≤20.0%, as determined by 13C NMR.

z4) The composition of any one of a)-y4) above, wherein the first interpolymer has a Tm value ≥50.0° C., or ≥55.0° C., or ≥60.0° C., or ≥62.0° C., or ≥64.0° C., or ≥66.0° C., or ≥68.0° C.

a5) The composition of any one of a)-z4) above, wherein the first interpolymer has a Tm value ≤90.0° C., or 85.0° C., or ≤80.0° C., or ≤78.0° C., or ≤76.0° C., or ≤74.0° C.

b5) The composition of any one of a)-a5) above, wherein the first interpolymer has a Tg value ≥−40.0° C., or ≥−38.0° C., or ≥−36.0° C., or ≥−34.0° C., or ≥−32.0° C., or ≥−30.0° C.

c5) The composition of any one of a)-b5) above, wherein the first interpolymer has a Tg value ≤−20.0° C., or ≤−22.0° C., or ≤−24.0° C.

d5) The composition of any one of a)-c5) above, wherein the first interpolymer has a Tc value ≥40.0° C., or ≥42.0° C., or ≥44.0° C., or ≥46.0° C., or ≥48.0° C., or ≥50.0° C.

e5) The composition of any one of a)-d5) above, wherein the first interpolymer has a Tc value ≤70.0° C., or ≤68.0° C., or ≤66.0° C., or ≤64.0° C., or ≤62.0° C., or ≤60.0° C.

f5) The composition of any one of a)-e5) above, wherein the first interpolymer has a % crystallinity ≥10.0%, or ≥12.0%, or ≥14.0%, or ≥16.0%, or ≥18.0%, or ≥20.0%.

g5) The composition of any one of a)-f5) above, wherein the first interpolymer has a % crystallinity ≤36.0%, or ≤34.0%, or ≤32.0%, or ≤30.0%, or ≤28.0%, or ≤26.0%.

h5) The composition of any one of a)-g5) above, wherein the composition comprises ≥18.0 wt %, or ≥20.0 wt %, or ≥22.0 wt %, or ≥24.0 wt %, or ≥26.0 wt %, of the interpolymer composition, based on the weight of the composition.

i5) The composition of any one of a)-h5) above, wherein the composition comprises ≤40.0 wt %, or ≤38.0 wt %, or ≤36.0 wt %, or ≤34.0 wt %, or ≤32.0 wt %, or ≤30.0 wt %, of the interpolymer composition, based on the weight of the composition.

j5) The composition of any one of a)-i5) above, wherein the composition further comprises a calcined filler formed from a filler composition comprising a kaolinite.

k5) The composition of j5) above, wherein the filler composition further comprises a silica. 15) The composition of j5) or k5) above, wherein the weight ratio of the calcined filler to the interpolymer composition is ≥0.80, or ≥0.85, or ≥0.90, or ≥0.95, or ≥1.00, or ≥1.05.

m5) The composition of any one of j5)-l5) above, wherein the weight ratio of the calcined filler to the interpolymer composition is ≤1.30, or ≤1.25, or ≤1.20, or ≤1.15, or ≤1.10.

n5) The composition of any one of j5)-m5) above, wherein the calcined filler is surface treated with a composition comprising a mercapto-silane, an alkyl silane, a vinyl silane, an epoxy, or an amino silane.

o5) The composition of any one of a)-n5) above, wherein the composition further comprises carbon black.

p5) The composition of o5) above, wherein the weight ratio of the carbon black to the interpolymer composition is ≥0.40, or ≥0.45, or ≥0.50, or ≥0.55, or ≥0.60, or ≥0.65, or ≥0.70, or ≥0.75.

q5) The composition of o5) or p5) above, wherein the weight ratio of the carbon black to the interpolymer composition is ≤1.10, or ≤1.05, or ≤1.00, or ≤0.95, or ≤0.90, or ≤0.85, or ≤0.80.

r5) The composition of any one of o5)-q5) above, wherein the weight ratio of the carbon black to the calcined filler is ≥0.50, or ≥0.55, or ≥0.60, or ≥0.65.

s5) The composition of any one of o5)-r5) above, wherein the weight ratio of the carbon black to the calcined filler is ≤0.90, or ≤0.85, or ≤0.80, or ≤0.75, or ≤0.70.

t5) The composition of any one of a)-s5) above, wherein the composition further comprises an oil.

u5) The composition of t5) above, wherein the weight ratio of the oil to the interpolymer composition is ≥0.55, or ≥0.60, or ≥0.65, or ≥0.70.

v5) The composition of t5) or u5) above, wherein the weight ratio of the oil to the interpolymer composition is ≤0.90, or ≤0.85, or ≤0.80, or ≤0.75.

w5) The composition of any one of a)-v5) above, wherein the composition has a Mooney Viscosity (ML(1+4) at 100° C.) ≥10, or ≥12, or ≥14, or ≥16, or ≥18, or ≥20.

x5) The composition of any one of a)-w5) above, wherein the composition has a Mooney Viscosity (ML(1+4) at 100° C.) ≤40, or ≤38, or ≤36, or ≤34, or ≤32, or ≤30.

y5) The composition of any one of a)-x5) above, wherein the composition further comprises a crosslinking agent.

z5) The composition of y5) above, wherein the crosslinking agent comprises sulfur, one or more activators, and/or one or more accelerators, and further sulfur.

a6) The composition of z5) above, wherein the crosslinking agent is present in an amount from 0.5 phr to 18 phr, or from 5.0 phr to 18 phr, or from 12 phr to 18 phr, based on the 100 parts of the interpolymer composition.

b6) A crosslinked composition formed from the composition of any one of a)-a6) above.

c6) The composition of any one of a)-b6) above, wherein the composition has a Shore A Hardness ≥70, or ≥71, or ≥72, or ≥73.

d6) The composition of any one of a)-c6) above, wherein the composition has a Maximum Tensile Strength (100%) ≥4 MPa, or ≥5 MPa, or ≥6 MPa.

e6) The composition of any one of a)-d6) above, wherein the composition has a Tear Strength ≥15.0 N/m, or ≥15.2 N/m, or ≥15.4 N/m.

f6) The composition of any one of a)-e6) above, wherein the composition has a Modulus (100%) ≥2.10 MPa, or ≥2.20 MPa, or ≥2.30 MPa, or ≥2.40 MPa.

g6) A crosslinked composition formed from the composition of any one of a)-f6) above.

h6) An article comprising at least one component formed from the composition of any one of a)-g6) above.

i6) The article of h6), above, wherein the article is an automotive part.

j6) The article of h6) or i6), above, wherein the article is an extruded article (for example, an extruded profile), an injected molded article, or a thermoformed article, and further an extruded article (for example, an extruded profile).

k6) The article of any one of h6)-j6) above, wherein the article is selected from a weather strip, a hose (for example, an automotive hose), a belt (for example, an automotive belt), a building material, a roofing membrane, a wire and cable jacket, a flooring material, a computer part, a gasket, or a tire.

TEST METHODS

Gel Permeation Chromatography

The chromatographic system consisted of a PolymerChar GPC-IR (Valencia, Spain) high temperature GPC chromatograph, equipped with an internal IRS infra-red detector (IRS). The autosampler oven compartment was set at 160° Celsius, and the column compartment was set at 150° Celsius. The columns were four Agilent "Mixed A" 30 cm, 20-micron linear mixed-bed columns, and a 20-micron pre-column. The chromatographic solvent was 1,2,4-trichlorobenzene, which contained "200 ppm of butylated hydroxytoluene (BHT)." The solvent source was nitrogen sparged. The injection volume was 200 microliters, and the flow rate was 1.0 milliliters/minute.

Calibration of the GPC column set was performed with "21 narrow molecular weight distribution polystyrene standards," with molecular weights ranging from 580 to 8,400,000 g/mol, and which were arranged in six "cocktail" mixtures, with at least a decade of separation between individual molecular weights. The standards were purchased from Agilent Technologies. The polystyrene standards were prepared at "0.025 grams in 50 milliliters of solvent" for molecular weights equal to, or greater than, 1,000,000 g/mol, and "0.05 grams in 50 milliliters of solvent" for molecular weights less than 1,000,000 g/mol. The polystyrene standards were dissolved at 80° Celsius, with gentle agitation, for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQN. 1)},$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects, such that linear homopolymer polyethylene standard is obtained at 120,000 Mw.

The total plate count of the GPC column set was performed with decane (prepared at "0.04 g in 50 milliliters of TCB," and dissolved for 20 minutes with gentle agitation.) The plate count (Equation 2) and symmetry (Equation 3) were measured on a "200 microliter injection," according to the following equations:

$$\text{Plate Count} = 5.54 * \left( \frac{(RV_{Peak\,Max})}{\text{Peak Width at } \frac{1}{2} \text{ height}} \right)^2, \quad \text{(EQN. 2)}$$

where RV is the retention volume in milliliters, the peak width is in milliliters, the peak max is the maximum height of the peak, and ½ height is ½ height of the peak maximum;

$$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})}, \quad \text{(EQN. 3)}$$

where RV is the retention volume in milliliters, and the peak width is in milliliters, Peak max is the maximum position of the peak, one tenth height is 1/10 height of the peak maximum, and where rear peak refers to the peak tail at later retention volumes than the peak maximum, and where front peak refers to the peak front at earlier retention volumes than the peak max. The plate count for the chromatographic system should be greater than 18,000, and the symmetry should be between 0.98 and 1.22.

Samples were prepared in a semi-automatic manner with the PolymerChar "Instrument Control" Software, wherein the samples were weight-targeted at "2 mg/ml," and the solvent (contained 200 ppm BHT) was added to a pre nitrogen-sparged septa-capped vial, via the PolymerChar high temperature autosampler. The samples were dissolved for two hours at 160° C., under "low speed" shaking. The calculations of Mn(GPC), Mw(GPC), and Mz(GPC) were based on GPC results using the internal IRS detector (measurement channel) of the PolymerChar GPC-IR chromatograph, according to Equations 4-6, and using PolymerChar GPCOneTM software, the baseline-subtracted IR chromatogram at each equally-spaced data collection point (i), and the polyethylene equivalent molecular weight obtained from the narrow standard calibration curve for the point (i) from Equation 1.

$$Mn(GPC) = \frac{\sum\limits_{i} IR_i}{\sum\limits_{i} (IR_i / M_{polyethylene_i})}, \quad \text{(EQN. 4)}$$

$$Mw(GPC) = \frac{\sum\limits_{i} (IR_i * M_{polyethylene_i})}{\sum\limits_{i} IR_i}, \quad \text{(EQN. 5)}$$

$$Mz(GPC) = \frac{\sum\limits_{i} (IR_i * M_{polyethylene_i}^2)}{\sum\limits_{i} (IR_i * M_{polyethylene_i})}. \quad \text{(EQN. 6)}$$

In order to monitor the deviations over time, a flowrate marker (decane) was introduced into each sample, via a micropump, controlled with the PolymerChar GPC-IR system. This flowrate marker (FM) was used to linearly correct the pump flowrate (Flowrate(nominal)) for each sample, by RV alignment of the respective decane peak within the sample (RV(FM Sample)) to that of the decane peak within the narrow standards calibration (RV(FM Calibrated)). Any changes in the time of the decane marker peak were then assumed to be related to a linear shift in flowrate (Flowrate (effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system, based on a flow marker peak, the effective flowrate (with respect to the narrow standards calibration) was calculated as in Equation 7. Processing of the flow marker peak was done via the PolymerChar GPCOneTM Software. Acceptable flowrate correction is such that the effective flowrate should be within +/−1% of the nominal flowrate: Flowrate(effective)=Flowrate(nominal)*(RV(FM Calibrated)/RV(FM Sample)) (EQN. 7).

Dynamic Mechanical Spectroscopy (DMS)

Small angle oscillatory shear was performed using a TA Instruments ARES, equipped with "25 mm parallel plates," under a nitrogen purge. The time between sample loading, and the beginning of the test, was set to five minutes for all samples. The experiments were performed at 190° C., over a frequency range of 0.1 to 100 rad/s. The strain amplitude was adjusted, based upon the response of the samples, from 1 to 3%. The stress response was analyzed in terms of amplitude and phase, from which the storage modulus (G'), loss modulus (G"), dynamic viscosity η*, and tan delta could be calculated. Specimens for Dynamic Mechanical Spectroscopy were "25 mm diameter×3.3 mm thick" compression molded discs, formed at 180° C., and 10 MPa molding pressure, for five minutes, ambient atmosphere, and then quenched between chilled platens (15-20° C.) for two minutes. The Viscosities (V0.1, V100) and the rheology ratio (V0.1/V100 or RR), each at 190° C.; were recorded.

Mooney Viscosity of Polymer Composition

Mooney viscosity (ML1+4) and stress relaxation (ML1+4+3 min) of each polymer composition was recorded with an Alpha Technologies MV2000E Viscometer according to ASTM D1646, at 100° C. (large rotor). The preheating time was one minute. The viscosity of each formulated compositions was measured using an uncured sheet (see experimental section) of about 25 grams.

Mooney Viscosity of Polymer

Mooney Viscosity (ML1+4 at 125° C.) of each polymer (and interpolymer composition) was measured in accordance with ASTM 1646, with a one minute preheat time and a "four minute" rotor operation time. The instrument was an Alpha Technologies Mooney Viscometer 2000. Sample size around 25 grams.

Cure Dynamics—MDR

Cure characteristics were measured using an Alpha Technologies Moving Die Rheometer (MDR) 2000 E, according to ASTM D5289, at 180° C., and with a 0.5 deg arc. The test period was 30 minutes. Each sample (6-8 grams) was cut from the respective uncured sheet (see experimental section). Reported values were ts2 (time to reach a "2 unit" increase in the torque from ML), t90 (time to reach 90% of the maximum cure), MH (maximum viscosity or maximum cure) and ML (minimum viscosity), and cure rate index.

Mooney Scorch was measured according to ASTM D-1646, using an Alpha Technologies Mooney Viscometer 2000. The Mooney Viscometer was set at 125° C., and the Mooney scorch values were reported for a small rotor, and represented the time to increase "x Mooney units (or torque units)" above the minimum viscosity (torque) (for example, t3 is the time needed to increase the viscosity "three torque units"). The total test time was 30 minutes, with a one minute preheat time. The viscosity of each composition was measured from the respective uncured sheet, which was cured in the viscometer, so that the scorch properties could be examined. Samples were conditioned for 24 hours at room temperature, prior to testing. The t3, t18 and cure index were reported according to ASTM D1646.

Tensile Strength

Tensile properties were measured according to ASTM D412 using a Zwick Roell Z010 device. Each dumbbell sample (type 5A) was cut from a compression molded (cured) plaque (t90+3 min, 180° C., 100 bars, ambient atmosphere, 2 mm thick plaque)—see experimental section. Here "t90" is the time for the sample to reach 90% of its maximum cure value, as determined by MDR. Tensile properties (tensile strength, modulus and elongation) were measured at room temperature, following the method ASTM D-412, in the machine direction (500 mm/min).

Trouser Tear Strength (or Die-T Tear Strength)

Trouser Tear Strength was measured according to ASTM D624 type-T (Trouser Tear sample) on a Zwick Roell Z010 device, with a traverse speed of 100 mm/min. Test specimens were cut from compression molded (cured) plaques (t90+3 minutes, 180° C., 100 bars, ambient atmosphere, 2 mm thick plaque)—see experimental section.

Shore A Hardness

Shore A Hardness was measured according to ASTM D2240, using 3-layers of compression molded plaques (t90+3 minutes, 180° C., 100 bars, ambient atmosphere, (10 cm×10 cm×2 mm) plaque, 6 mm total thickness for three layers). See experimental section. Shore A hardness was measured on a Shore A Durometer Model 2000, made by INSTRON, with a Durometer Stand Model 902. This method permits hardness measurements, based on either initial indentation, or indentation after a specific time, or both. Here, the indentation was measured after at a specified time of three seconds.

Density of Cured Polymer Composition

The density of each cured composition was determined according to the Archimedean principle (ASTM B962-17). Each test sample (approx. 10 grams) was cut from a compression molded (cured) plaque (t90+3 minutes, 180° C., 100 bars, ambient atmosphere, 2 mm thick plaque)—see experimental section. The test sample was dried and weighed, after immersion in isopropanol at room temperature.

Green Strength

Green Strength properties were measured according to ASTM D412, using a Zwick Roell Z010 device, with a test speed of 500 mm/min, a pre-load of 0.2N, and a temperature of 23° C. Each dumbbell (type 5A) sample was cut from an uncured sheet, processed using a two-roll mill (90° C.). See the experimental section.

Differential Scanning Calorimetry (DSC)

Differential Scanning calorimetry (DSC) was used to measure crystallinity in ethylene-based (PE) samples (including noted EPDMs in experimental section) and propylene-based (PP) samples. Each sample (0.5 g) was compression molded into a film, at 5000 psi, 190° C., for two minutes. About 5 to 8 mg of film sample was weighed and placed in a DSC pan. The lid was crimped on the pan to ensure a closed atmosphere. The sample pan was placed in a DSC cell, and then heated, at a rate of approximately 10° C./min, to a temperature of 180° C. for PE (230° C. for PP). The sample was kept at this temperature for three minutes. Then the sample was cooled at a rate of 10° C./min to −90° C. for PE (−60° C. for PP), and kept isothermally at that temperature for three minutes. The sample was next heated at a rate of 10° C./min, until complete melting (second heat). The percent crystallinity was calculated by dividing the heat of fusion (Hf), determined from the second heat curve, by a theoretical heat of fusion of 292 J/g for PE (165 J/g for PP), and multiplying this quantity by 100 (for example, % cryst.=(Hf/292 J/g)×100 (for PE)). Unless otherwise stated, melting point(s) (Tm) of each polymer was determined from the second heat curve, and the crystallization temperature (Tc) was determined from the first cooling curve. The respective peak temperatures for the Tm and the Tc were recorded.

Melt Index Measurement

The melt index (12) of an ethylene-based polymer is measured in accordance with ASTM D-1238, condition 190° C./2.16 kg. Melt index (I5) of an ethylene-based polymer is measured in accordance with ASTM D-1238, condition 190° C./5.0 kg. Melt index (I10) of an ethylene-based polymer is measured in accordance with ASTM D-1238, condition 190° C./10.0 kg. High load melt index (I21) of an ethylene-based polymer is measured in accordance with ASTM D-1238, condition 190° C./21.0 kg. The melt flow rate (MFR) of a propylene-based polymer is measured in accordance with ASTM D-1238, condition 230° C./2.16 kg.

Polymer Density

Polymer density is measured in accordance with ASTM D-297.

FTIR Method for EPDM Composition Analysis

The EPDM terpolymers containing ethylene, propylene, and 5-ethylidene-2-norbor-nene were analyzed using ASTM D3900 for ethylene content, and ASTM D6047 for ethylidene-norbornene content.

13C NMR Method for EPDM Composition Analysis

The samples were prepared by adding approximately "2.6 g" of a "50/50 mixture of tetrachloroethane-d2/orthodichlorobenzene," that was "0.025M" in chromium acetylacetonate (relaxation agent), to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temperature CryoProbe. The data was acquired using "160 scans per data file," a six second pulse repetition delay, with a sample temperature of 120° C. The acquisition was carried out using a spectral width of 25,000 Hz and a file size of 32K data points.

NMR spectral analysis of each sample composition was carried out using the following analysis method. Quantitation of monomers present in EPDM can be calculated using the following equations (1 through 9). The calculation of moles ethylene normalizes the spectral range from 55.0 to 5.0 ppm to 1000 integral units. The contribution under the normalized integral area only accounts for seven of the ENB carbons. The ENB diene peaks at 111 ppm and 147 ppm are excluded from the calculation, due to concerns that double bonds may react at high temperatures.

$$\text{moles}E=(1000-3*\text{moles}P-7*\text{moles}ENB)/2; \quad \text{Equation 1}$$

$$\text{moles}ENB=CH_3(13.6-14.7\ \text{ppm}); \quad \text{Equation 2}$$

$$\text{moles}P=CH_3(19.5-22.0\ \text{ppm}); \quad \text{Equation 3}$$

$$\text{mole \% ethylene}=(100*\text{moles}E)/(\text{moles}E+\text{moles}P+\text{moles}ENB); \quad \text{Equation 4}$$

$$\text{mole \% propylene}=(100*\text{moles}P)/(\text{moles}E+\text{moles}P+\text{moles}ENB); \quad \text{Equation 5}$$

$$\text{mole \% ENB}=(100*\text{moles}ENB)/(\text{moles}E+\text{moles}P+\text{moles}ENB); \quad \text{Equation 6}$$

$$\text{wt \% ethylene}=(100*\text{moles}E*28)/(\text{moles}E*28+\text{moles}P*24+\text{moles}ENB*120); \quad \text{Equation 7}$$

$$\text{wt \% propylene}=(100*\text{moles}P*42)/(\text{moles}E*28+\text{moles}P*42+\text{moles}ENB*120); \quad \text{Equation 8}$$

$$\text{wt \% ENB}=(100*\text{moles}ENB*120)/(\text{moles}E*28+\text{moles}P*42+\text{moles}ENB*120). \quad \text{Equation 9}$$

The 13C NMR spectral analysis of the EPDM can be used to quantitate the level of tacticity (% mm). In one embodiment, each EPDM (inventive compositions) independently displays a peak area from 21.3-22.0 ppm (rmmr, mmmr, mmmm) greater than 3.5% of the total integral area from 19.5 to 22.0 ppm. Spectral data were referenced to the EEE backbone at 30 ppm. Peak responses in this region typically are related to differences in propylene tacticity (% mm) that have been incorporated into the EPDM. A similar analysis can be done for another type of ethylene/alpha-olefin/non-conjugated polyene interpolymer.

EXPERIMENTAL

Reagents and Commercial Polymers

SPHERON 6000A—Carbon black, reinforcement/filler, available from Cabot.

SILFIT Z91—White (Calcined) Filler, available from Hoffmann Mineral GmbH. SILFIT Z91 is a natural combination of silica (corpuscular) and kaolinite (lamellar) that has been heat treated.

SUNPAR 2280—Plasticizer/paraffinic oil, available from R. E. Carroll, Inc.

RHENOGRAN ZnO-70—Cure Activator, available from Rhein Chemie.

Stearic acid—Cure Activator and process aid, available from Loxiol.

RHENOGRAN CaO-80—Desiccant, available from Rhein Chemie.

CARBOWAX PEG 4000—Process aid (Polyethylene Glycol), available from The Dow Chemical Company.

STRUKTOL W33—Dispersant, available from Struktol.

RHENOGRAN RETARDER E-80—Cure Retarder, available from Rhein Chemie.

RHENOGRAN MBTS-70—Cure Accelerator, available from Rhein Chemie.

RHENOGRAN ZBEC-70—Cure Accelerator, available from Rhein Chemie.

RHENOGRAN TP-50—Cure Accelerator, available from Rhein Chemie.

RHENOGRAN CBS-80—Delayed action Accelerator, available from Rhein Chemie.

RHENOGRAN CLD-80—Sulfur donor, available from Rhein Chemie.

RHENOGRAN S-80—Curative, available from Rhein Chemie.

NORDEL EPDM 4725P with a Mooney Viscosity (ML1+4, 125° C.) of 25, a density of 0.88 g/cc, a mass percent ethylene of 70% (ASTM D3900), and a mass percent ENB of 4.9% (ASTM D6047). Available from The Dow Chemical Company.

KEP 510 EPDM—with a Mooney Viscosity (ML(1+4) 125° C.) or 23, an ethylene content of 71%, an ENB content of 5.7%, and available from Kumho Polychem Co., Ltd.

Representative Synthesis of Experimental EPDM

Continuous Polymerization

The polymerization reaction was performed under steady state conditions, that is, constant reactant concentration and continual input of solvent, monomers, and catalyst, and constant withdrawal of unreacted monomers, solvent and polymer. The reactor system was cooled and pressurized to prevent formation of a vapor phase. Monomers were ethylene (CAS 74-85-1), propylene (CAS 115-07-1), and 5-ethylidene-2-norbomene (ENB, CAS 16219-75-3). The polymer composition was produced in a solution polymerization process, using a continuous stir-tanked reactor followed by loop reactor. Ethylene was introduced in a mixture of a solvent of ISOPAR E (available from ExxonMobil). Propylene and 5-ethyli-dene-2-norbomene (ENB) were each introduced to the reactor as a reactor feed stream. Catalyst was fed to each the reactor separately, and activated, in-situ, using co-catalyst 1 and co-catalyst 2.

The outlet of each reactor was consequently a mixture of polymer, solvent, and reduced levels of the initial monomers. The outlet of the first reactor was fed directly into the second reactor (unless otherwise sampled). The molecular weight of the polymer was controlled by adjusting each reactor's temperature, monomer conversion and/or the addition of a chain terminating agent, such as hydrogen. After polymerization, a small amount of water was introduced into the reactor exit stream as a catalyst kill, and the reactor exit stream was introduced into a flash vessel, in which the solids concentration was increased by at least 100 percent. A portion of each unreacted monomers, that is, ENB, ethylene, and propylene, and solvent, was then collected, and recycled back to the reactor feed(s) as appropriate. See also U.S. Pat. Nos. 5,977,251 and 6,545,088, and the references therein. Monomer feed rate, polymerization temperature and other conditions are listed in below in Table 1 and Table 2. Polymer properties are listed in Table 3. Properties of the comparative polymers are listed in Table 4.

TABLE 1

Reaction Conditions for Synthesized EPDM

| | Reactor Temp. [degC.] | Pressure [psig] | Solvent/ Ethylene Feed Ratio [lb/lb] | Propylene/ Ethylene Feed Ratio [lb/lb] | ENB/ Ethylene Feed Ratio [lb/lb] |
|---|---|---|---|---|---|
| EPDM01-R1 (first reactor) | 130 | 743 | 0.0926 | 0.2800 | 0.1867 |
| EPDM01 (second reactor) | 165 | 725 | 0.0304 | 0.4326 | 0.0593 |
| EPDM02-R1 (first reactor) | 127 | 725 | 0.0983 | 0.2697 | 0.1816 |
| EPDM02 (second reactor) | 170 | 725 | 0.0294 | 0.4783 | 0.0679 |

TABLE 2

Reaction Conditions for Synthesized EPDM

| | H2 mol % | C2 Concen. [g/L] | Catalyst* Catalyst Efficiency [lb_poly/lb_metal] x10E6 | Cocatalyst-1** Borate/Cat. Metal Ratio [mol/mol] | Cocatalyst-2*** Aluminum/Cat. Metal Ratio [mol/mol] |
|---|---|---|---|---|---|
| EPDM01-R1 (first reactor) | 0.11 | 23.0 | 12.8 | 1.9 | 32.3 |
| EPDM01 (second reactor) | 0.20 | 10.3 | 13.8 | 2.0 | 5.1 |
| EPDM02-R1 (first reactor) | 0.01 | 22.2 | 0.84 | 2.0 | 9.9 |
| EPDM02 (second reactor) | 2.17 | 6.2 | 0.59 | 2.0 | 10.0 |

*Catalyst is [[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafnium dimethyl.
**Cocatalyst-1 was a mixture of methyldi(C14-18 alkyl)ammonium salts of tetrakis(pentafluorophenyl)borate, prepared by reaction of a long chain trialkylamine (ARMEEN M2HT, available from Akzo-Nobel, Inc.), HCl and Li[B(C6F5)4], substantially as disclosed in U.S. Pat. No. 5,919,988 (Ex. 2). Cocatalyst-1 was purchased from Boulder Scientific, and used without further purification.
***Cocatalyst-2, (modified methylalumoxane (MMAO)), was purchased from Akzo Nobel, and used without further purification.

TABLE 3

Property Data for Interpolymer compositions-Inventive

| | | | EPDM01 | | EPDM02 | |
|---|---|---|---|---|---|---|
| Interpolymer composition | | Units | First reactor^ | Second reactor (final polymer composition) | First reactor | Second reactor (final polymer composition) |
| | wt % C2 | | 72.8** | 72.4*** | 72.81** | 71.94*** |
| | wt % C3 | | 20.6** | 20.9*** | 20.85** | 21.41*** |
| | wt % ENB | | 6.6** | 6.7*** | 6.34** | 6.65*** |
| Amount of first reactor component (first interpolymer) | wt %* | | | 33.88 | | 32.08 |
| Polymer Mooney | ML (1 + 4) 125° C. | MU | NM | 29.0 | NM | 31.7 |
| CONV. GPC | Mn | g/mol | 140,563 | 23,390 | 108,966 | 29,452 |
| | Mw | g/mol | 316,096 | 160,648 | 241,296 | 133,153 |
| | Mz | g/mol | 637,513 | 570,886 | 460,156 | 392,715 |

TABLE 3-continued

Property Data for Interpolymer compositions-Inventive

| Interpolymer composition | | Units | EPDM01 First reactor^ | EPDM01 Second reactor (final polymer composition) | EPDM02 First reactor | EPDM02 Second reactor (final polymer composition) |
|---|---|---|---|---|---|---|
| | $M_w/M_n$ = MWD | | 2.25 | 6.87 | 2.21 | 4.52 |
| | $M_z/M_n$ | | 4.54 | 24.4 | 4.22 | 13.3 |
| | $M_z/M_w$ | | 2.02 | 3.55 | 1.91 | 2.95 |
| Viscosity at 0.1 rad/s | V0.1 (0.1, 190° C.) | Pa · s | 571,039 | 69,217 | 310,398 | 51,238 |
| Viscosity at 100 rad/s | V100 (100, 190° C.) | Pa · s | 9,475 | 1,891 | 8,344 | 2,022 |
| Tan Delta | | | 1.08 | 1.37 | 1.19 | 1.60 |
| Delta Delta | | | 29.9 | 23.7 | 27.0 | 24.0 |
| Rheology Ratio | RR = V0.1/V100 | | 60.3 | 36.6 | 37.2 | 25.3 |
| Rheology Parameter | (RR/Mn) × 1000 | mol/g | 0.43 | 1.56 | 0.34 | 0.86 |
| RR/MWD | | | 26.8 | 5.33 | 16.8 | 5.60 |
| $T_m$ (DSC) | | ° C. | 72.3 | 68.4 | 71.7 | 66.3 |
| $T_g$ (DSC) | | ° C. | −26.9 | −37.4 | −26.9 | −37.5 |
| $T_c$ (DSC) | | ° C. | 57.3 | 57.7 | 55.8 | 53.4 |
| % cryst. | (Hf/292 J/g) × 100 | | 21.1 | 18.6 | 20.8 | 16.8 |

A) First Reactor = First (EPDM) Interpolymer.
NM = Not measured
*Based on weight of second (final) reactor product.
**The wt % defined as the wt % of the noted monomer in the first (EPDM) interpolymer, and based on the weight of the first interpolymer.
***The wt % is defined as the average wt % of the noted monomer in the first (EPDM) and the second (EPDM) interpolymers, and based on the weight of the first and the second interpolymers.

TABLE 4

Property Data for Comparative Polymers

| | | Comparative EPDM A NORDEL 4725P | Comparative EPDM B KEP 510 |
|---|---|---|---|
| C2 | % | 70 | 71 |
| ENB | % | 4.9 | 5.7 |
| Mooney Viscosity (ML ((1 + 4)@125° C.) | MU | 25 | 23 |
| Mn | g/mol | 37,439 | 21,125 |
| Mw | g/mol | 119,369 | 171,456 |
| MWD | g/mol | 3.19 | 8.12 |
| Tan Delta | | 2.17 | 1.27 |
| Delta Delta | | 23.8 | 15.4 |
| Rheology Ratio (RR) | | 13 | 46 |
| RR/Mn*1000 | mol/g | 0.35 | 2.18 |
| RR/MWD | | 4.08 | 5.67 |

Compositions

Formulated polymer compositions are listed in Table 5 below.

TABLE 5

Polymer Compositions (wt. parts)

| | Inv. 1 | Inv. 2 | Comp. A | Comp. B |
|---|---|---|---|---|
| Interpolymer composition/amt. | EPDM01/100 | EPDM02/100 | NORDEL 4725P/100 | KEP 510/100 |
| SPHERON 6000A | 75 | 75 | 75 | 75 |
| SILFIT Z91 | 110 | 110 | 110 | 110 |
| SUNPAR 2280 | 70 | 70 | 70 | 70 |
| RHENOGRAN ZnO-70 | 5 | 5 | 5 | 5 |
| STEARIC ACID | 1 | 1 | 1 | 1 |
| RHENOGRAN CaO-80 | 8 | 8 | 8 | 8 |
| PEG4000 | 2 | 2 | 2 | 2 |
| STRUKTOL W33 | 2 | 2 | 2 | 2 |
| RETARDER E-80 | 0.5 | 0.5 | 0.5 | 0.5 |
| RHENOGRAN MBTS-70 | 1.5 | 1.5 | 1.5 | 1.5 |
| RHENOGRAN ZBEC-70 | 2 | 2 | 2 | 2 |
| RHENOGRAN TP-50 | 2.5 | 2.5 | 2.5 | 2.5 |
| RHENOGRAN CBS-80 | 0.5 | 0.5 | 0.5 | 0.5 |
| RHENOGRAN CLD-80 | 1 | 1 | 1 | 1 |
| RHENOGRAN S-80 | 0.75 | 0.75 | 0.75 | 0.75 |
| Total | 381.75 | 381.75 | 381.75 | 381.75 |

Each composition was mixed in a HARBURG FREUDENBERGER internal mixer, equipped with intermeshing rotors, using a standard "upside-down" mixing procedure, and adding the interpolymer composition (EPDM) last, after the addition of all the additives. The "1.5 L net chamber" was filled to a filling level of 75%. The rotor speed was kept constant at 45 RPM during the mixing cycle. The feed temperature was 50° C., and the final composition was mixed for 240 seconds or mixed until the drop temperature reached 110° C., whichever came first. The composition was then homogenized on a two roll mill (90° C.) for three minutes, and sheeted out to form an uncured sheet. The rheology properties of each formulated composition are shown in Table 6.

TABLE 6

Rheology Properties of Each Formulated Composition

|  |  | Inventive 1 | Inventive 2 | Comparative A | Comparative B |
|---|---|---|---|---|---|
| Mooney Viscosity (ML (1 + 4)@100° C.) | MU | 23 | 29 | 22 | 21 |
| Rheology Ratio (RR) |  | 82 | 63 | 54 | 66 |

Figure 1:
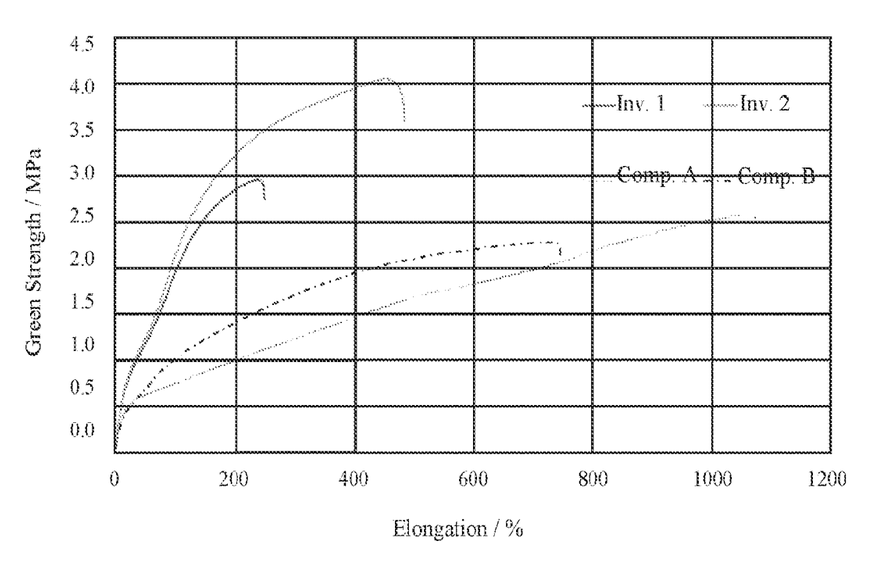
FIG. 1 depicts Green Strength profiles (Tensile Strength versus Elongation) for inventive and comparative compositions. Order of profiles from highest to lowest Green Strength at 200% Elongation: Inv. 2, Inv. 1, Comp. B, Comp. A.

Green Strength properties are shown in Table 7. See also FIG. 1. A higher Green Strength is usually required, in order to have superior dimensional stability of a complex profile, extruded from the formulated composition. Typically, in an electrically resistive EPDM-based formulation, the reduction in the carbon black (CB) and the increase in a non-reinforcing white filler result in inferior Green Strength of the formulated composition, and thus, inferior dimensional stability of an extruded profile formed from such composition. However, it was discovered that the "low Mooney" formulated compositions of the invention provide significantly higher Green Strength, as compared to the comparative compositions. This was also evident from the Modulii values at lower elongation (25%, 50%, and 100%), which were significantly higher for the inventive compositions. Cure characteristics and Mooney Scorch are shown in Table 8.

TABLE 7

Green Strength Measurements according to ASTM D412 with a Test Speed of 500 mm/min at 23° C.

|  | Modulus 25% MPa | Modulus 50% MPa | Modulus 100% MPa | Max. Tensile Strength MPa | Max. Elongation % |
|---|---|---|---|---|---|
| Inv. 1 | 0.9 | 1.2 | 2.0 | 3.1 | 258 |
| Inv. 2 | 0.8 | 1.2 | 2.1 | 3.9 | 486 |

TABLE 7-continued

Green Strength Measurements according to ASTM D412 with a Test Speed of 500 mm/min at 23° C.

|  | Modulus 25% MPa | Modulus 50% MPa | Modulus 100% MPa | Max. Tensile Strength MPa | Max. Elongation % |
|---|---|---|---|---|---|
| Comp. A | 0.6 | 0.7 | 0.8 | 2.5 | 1043 |
| Comp. B | 0.5 | 0.7 | 1.0 | 2.3 | 729 |

TABLE 8

Cure and Scorch Characteristics of Formulated Compositions Containing EPDMs

|  | Formulation mixing | | MDR, ASTM D5289, 180° C. | | | | | Mooney Scorch, ASTM D1646, 125° C. | | |
|---|---|---|---|---|---|---|---|---|---|---|
|  | Time (s) | Final Temp (° C.) | ML (dNm) | MH (dNm) | MH-ML (dNm) | ts2 (min) | t90 (min) | Cure rate index (s$^{-1}$) | t3 (min) | t18 (min) | Cure Index (min) |
| Inv. 1 | 240 | 89 | 0.49 | 6.71 | 6.22 | 1.10 | 2.31 | 82.6 | 10.32 | 15.97 | 5.7 |
| Inv. 2 | 240 | 91 | 0.50 | 9.50 | 9.00 | 1.03 | 2.29 | 79.4 | 9.10 | 14.28 | 5.2 |
| Comp. A | 240 | 93 | 0.32 | 8.61 | 8.29 | 1.34 | 2.80 | 68.5 | 13.55 | 21.08 | 7.5 |
| Comp. B | 240 | 87 | 0.34 | 4.51 | 4.17 | 1.47 | 2.43 | 104.2 | 11.88 | 30.08 | 18.2 |

Inventive Examples 1 and 2 have higher "ML" values, as compared to the comparative compositions, which indicate a higher entanglement density for the inventive compositions. The two inventive compositions clearly showed significantly faster curing compared to the comparative compositions, as is indicated by lower ts2, t90, t3, and t18 values.

Garvey Die Extrusion—Extruded Profile

Garvey Die Extrusion was performed using a THERMO HAAKE POLYLAB System, associated with a HAAKE RHEOMEX 104. The barrel was heated to 70° C., and the extruder operated at a revolution speed of 50 RPM. Each formulated polymer composition was extruded through the ASTM Extrusion Garvey die, according to ASTM D2230. The temperature of the die was set to 100° C. The rating of the extruded profiles was done according to the ASTM D2230 Rating System A. Results are shown in Table 9.

According to ASTM D2230, the System A rating (visual observation against control samples) is based on four separate characteristics (Swelling, Edge, Surface, Corner), each ranked by a number from 1 (poor) to 4 (excellent). The rating for the "Swelling" refers to the swelling or porosity in the profile. "Edge" refers to the sharpness and continuity of the 30° edge. "Surface" refers to the smoothness of the surface. "Corner" refers to the sharpness and continuity of the corners. The inventive compositions gave much improved Garvey die ratings, compared to Comparative composition A, and similar ratings compared to Comparative composition B. As seen in Table 9, the inventive compositions form uniform extruded profiles that maintain good "System A" ratings.

TABLE 9

Ranking of Garvey Die Extruded Profiles according to ASTM D2230 Scheme A

|  | Swelling | Edge (30°) | Surface | Corner | Density (g/cc)* |
|---|---|---|---|---|---|
| Inv. 1 | 3 | 3 | 3 | 3 | 1.30 |
| Inv. 2 | 3 | 4 | 4 | 3 | 1.30 |
| Comp. A | 3 | 2 | 2 | 2 | 1.29 |
| Comp. B | 4 | 4 | 4 | 3 | 1.29 |

*Note, regarding density, 1 cc = 1 cm$^3$.

Compression Molded Plaques

The mechanical properties (Hardness, Tensile, Tear) of the cured polymer compositions were measured from compression molded plaques. For each formulated composition, a sample of the uncured sheet (see above) was compression molded, in accordance to ASTM D3182, using a PHI (100-ton press). The desired mold (10 cm×10 cm×2 mm) was placed on a platen. The sample (uncured blanket) was cut slightly smaller than the dimensions of the individual mold cavity. The mill direction was marked, and the sample was labeled. The sample was placed in a preheated mold, taking care to place properly for mill direction. The platens were closed. The molding pressure was 100 bars, and the temperature was 180° C. Cure times were specified, such as, for example, t90+3 minutes, where "t90" is the time for the sample to reach 90% of its maximum cure (MH), as determined by MDR. When the specified cure time ended, the bottom platen automatically opened. The sample was removed, and immediately placed in water to stop the curing. Samples were conditioned for 24 hours at room temperature, prior to testing. Mechanical properties are shown in Table 10 and Table 11 (after heat aging at 100° C. for 168 hours, in hot air).

TABLE 10

Mechanical Properties of Cured Formulated Compositions

|  |  |  | Tensile Strength, ASTM D412 | | |
|---|---|---|---|---|---|
|  | Hardness Shore A, ASTM D2240 | Trouser Tear Strength Type T, ASTM D624 N/mm | Modulus 100% (MPa) | Max. Tensile Strength (MPa) | Max. Elongation (%) |
| Inv. 1 | 74 | 18.1 | 2.47 | 6 | 704 |
| Inv. 2 | 73 | 15.5 | 2.48 | 8 | 673 |
| Comp. A | 64 | 13.8 | 1.79 | 7 | 741 |
| Comp. B | 63 | 12.3 | 1.70 | 5 | 655 |

TABLE 11

Mechanical Properties of Cured Formulated Compositions after Heat Ageing at 100° C. for 168 hrs

|  |  | Tensile Strength, ASTM D412 | | | | |
|---|---|---|---|---|---|---|
|  | Hardness Shore A, ASTM D2240 | Modulus 100% (MPa) | Retention (%) | Max. Tensile Strength (MPa) | Retention (%) | Max. Elongation (%) | Retention (%) |
| Inv. 1 | 78 | 3.41 | 138 | 6.6 | 105 | 530 | 75 |
| Inv. 2 | 78 | 3.33 | 134 | 7.2 | 94 | 502 | 75 |
| Comp. A | 67 | 2.58 | 144 | 5.7 | 85 | 474 | 64 |
| Comp. B | 68 | 2.54 | 149 | 5.8 | 118 | 463 | 71 |

As seen in Table 10, the inventive compositions have good mechanical properties, and exceptionally good Shore A Hardness and Tear Strength. As seen in Table 11, the inventive compositions maintain good mechanical properties after ageing at 100° C. (168 hours). It can also be observed that both inventive examples gave almost +10 units higher ShoreA hardness for the same formulation recipe. This is extremely crucial for higher hardness compositions, where the reduction in the carbon black loading results in a decrease in the hardness of the cured composition. It is noted that certain GRC and BLS profiles require very high hardness (≥90 Shore A). Several properties of the inventive compositions (for example, Shore A Hardness and Modulus 100%) improve after ageing.

What is claimed is:

1. A composition comprising an interpolymer composition, and wherein the interpolymer composition comprises a first ethylene/alpha-olefin/nonconjugated polyene interpolymer; and a second ethylene/alpha-olefin/nonconjugated polyene interpolymer; and
    wherein the interpolymer composition has a Mooney Viscosity (ML(1+4), 125° C.)<50, and a Rheology Parameter, ((RR/Mn)×1000), ≥0.60, wherein the nonconjugated polyene of the first interpolymer is ENB; and the nonconjugated polyene of the second interpolymer is ENB.

2. The composition of claim 1, wherein the interpolymer composition has a Rheology Parameter, ((RR/Mn)×1000), ≤2.00.

3. The composition of claim 1, wherein the interpolymer composition has a Mooney Viscosity (ML(1+4), 125° C.)≥10.

4. The composition of claim 1, wherein the interpolymer composition has a RR/MWD ratio ≥4.40.

5. The composition of claim 1, wherein the interpolymer composition has a molecular weight distribution MWD ≥3.60.

6. The composition of claim 1, wherein the interpolymer composition has a molecular weight ratio Mz/Mn ≤30.0.

7. The composition of claim 1, wherein the interpolymer composition has a ratio {[(RR/Mn)×1000]Interpolymer composition/[(RR/Mn)×1000]First Interpolymer}≥2.00.

8. The composition of claim 1, wherein the interpolymer composition has a ratio {[RR/MWD]First Interpolymer/[RR/MWD]Interpolymer composition}≥2.50.

9. The composition of claim 1, wherein the interpolymer composition has a ratio {[Mn]First Interpolymer/[Mn]Interpolymer composition}≥3.00.

10. The composition of claim 1, wherein the first interpolymer is a first EPDM and the second interpolymer is a second EPDM; and wherein the second EPDM differs from the first EPDM in at least one property selected from Mn, Mw, Mz, MWD, Mooney Viscosity, V0.1, V100, RR, or any combination thereof.

11. The composition of claim 1, wherein the average of the ENB of the first interpolymer and the ENB of the second interpolymer is ≥5.2 wt %, based on the sum weight of the first interpolymer and the second interpolymer.

12. A crosslinked composition formed from the composition of claim 1.

13. An article comprising at least one component formed from the composition of claim 1.

14. The article of claim 13, wherein the article is an extruded article, an injection molded article, or a thermoformed article.

* * * * *